(12) United States Patent
Aroniss

(10) Patent No.: US 9,066,508 B2
(45) Date of Patent: Jun. 30, 2015

(54) GROUND TRAP FOR EASTERN CICADA KILLER WASP

(76) Inventor: John M. Aroniss, Levittown, PA (US)

( * ) Notice: Subject to any disclaimer, the term of this patent is extended or adjusted under 35 U.S.C. 154(b) by 279 days.

(21) Appl. No.: 13/573,227

(22) Filed: Aug. 31, 2012

(65) Prior Publication Data

US 2013/0067797 A1    Mar. 21, 2013

Related U.S. Application Data

(60) Provisional application No. 61/573,183, filed on Sep. 21, 2011.

(51) Int. Cl.
*A01M 1/10* (2006.01)
*A01M 1/14* (2006.01)

(52) U.S. Cl.
CPC *A01M 1/106* (2013.01); *A01M 1/14* (2013.01)

(58) Field of Classification Search
CPC .......... A01M 1/10; A01M 1/106; A01M 1/14
USPC ................. 43/122, 107, 114; 229/100, 122.2, 229/122.27, 122.28, 122.3, 162.1
See application file for complete search history.

(56) References Cited

U.S. PATENT DOCUMENTS

| | | | | |
|---|---|---|---|---|
| 584,378 | A * | 6/1897 | Lewis | 43/107 |
| 1,072,342 | A * | 9/1913 | Louviere | 43/107 |
| 1,112,064 | A * | 9/1914 | Gordon | 43/114 |
| 1,247,724 | A * | 11/1917 | Sassenhoff | 43/107 |
| 1,521,261 | A * | 12/1924 | Tschernitschek | 43/114 |
| 1,606,568 | A * | 11/1926 | Gross | 43/107 |
| 1,815,652 | A * | 7/1931 | Gring | 43/107 |
| 1,857,890 | A * | 5/1932 | Sullivan | 43/107 |
| 2,071,121 | A * | 2/1937 | Harlow | 229/162.1 |
| 2,424,421 | A * | 7/1947 | Temme | 43/122 |
| 2,650,451 | A * | 9/1953 | Karstedt | 229/162.1 |
| 3,077,978 | A * | 2/1963 | Krzyzanowski et al. | 229/162.1 |
| 3,581,429 | A * | 6/1971 | Hickman et al. | 43/107 |
| 3,708,908 | A * | 1/1973 | Levey | 43/122 |
| 3,959,914 | A * | 6/1976 | Kaveloski | 43/107 |
| 4,112,609 | A * | 9/1978 | Kaveloski | 43/122 |
| 4,258,842 | A * | 3/1981 | Falkstein | 229/194 |
| 4,400,903 | A * | 8/1983 | Seidenberger | 43/122 |
| 4,442,624 | A * | 4/1984 | Browne | 43/122 |
| 4,557,069 | A * | 12/1985 | Caldwell | 43/122 |
| 4,592,163 | A * | 6/1986 | Wilson | 43/122 |
| 5,060,853 | A * | 10/1991 | Gulliver et al. | 229/162.1 |
| 5,243,781 | A * | 9/1993 | Carter | 43/122 |

(Continued)

FOREIGN PATENT DOCUMENTS

| | | | | |
|---|---|---|---|---|
| JP | 09009815 A | * | 1/1997 | A01M 1/10 |
| JP | 2001054346 A | * | 2/2001 | A01M 1/10 |

(Continued)

*Primary Examiner* — Darren W Ark
(74) *Attorney, Agent, or Firm* — Leander F. Aulisio

(57) ABSTRACT

The present invention relates to a ground trap for catching the female eastern cicada killer wasp as the wasp is flying out of a burrow, wherein the ground trap includes a generally rectangular body and a generally square top section; the top section including a transparent window to allow light into the inside of the trap body; wherein the bottom of the trap is left open so that the flying insect can pass from the burrow directly into the trap; the bottom of the trap being beveled such that the trap is leaning to one side at an angle of about 45 degrees with respect to the ground, thus allowing the insect to more readily attach to glue-coated sidewalls of the trap.

5 Claims, 3 Drawing Sheets

(56) References Cited

U.S. PATENT DOCUMENTS

| | | | |
|---|---|---|---|
| 5,987,809 A * | 11/1999 | Cheok | 43/122 |
| 6,516,558 B1 * | 2/2003 | Lingren et al. | 43/107 |
| 6,625,922 B1 | 9/2003 | Ernsberger | |
| 6,766,611 B2 * | 7/2004 | Prince | 43/107 |
| 7,412,797 B1 * | 8/2008 | Hiscox | 43/122 |
| 7,669,362 B2 | 3/2010 | Cwiklinski et al. | |
| 7,694,455 B1 * | 4/2010 | Bowden et al. | 43/107 |
| D656,216 S * | 3/2012 | Rubel | D22/122 |
| 8,695,792 B2 * | 4/2014 | Choi | 229/162.1 |
| 8,793,927 B2 * | 8/2014 | Winkler | 43/107 |
| 8,813,419 B2 * | 8/2014 | Schneidmiller et al. | 43/122 |
| 2004/0020104 A1 | 2/2004 | Feldhege et al. | |
| 2005/0279016 A1 * | 12/2005 | Williams et al. | 43/122 |
| 2006/0243785 A1 * | 11/2006 | Wang | 229/162.1 |
| 2009/0183419 A1 | 7/2009 | Harris | |
| 2009/0293342 A1 | 12/2009 | Winkler | |
| 2010/0043275 A1 | 2/2010 | Battick | |
| 2010/0139151 A1 | 6/2010 | Cwiklinski et al. | |
| 2014/0000151 A1 * | 1/2014 | Cowen | 43/107 |
| 2014/0007488 A1 * | 1/2014 | Calabrese | 43/115 |
| 2014/0053452 A1 * | 2/2014 | Hall, Jr. | 43/107 |
| 2014/0263600 A1 * | 9/2014 | Valencia | 229/162.1 |

FOREIGN PATENT DOCUMENTS

| | | | | |
|---|---|---|---|---|
| JP | 2004208670 A | * | 7/2004 | A01M 1/10 |
| JP | 2008161090 A | * | 7/2008 | A01M 1/10 |
| JP | 2011139693 A | * | 7/2011 | A01M 1/10 |

* cited by examiner

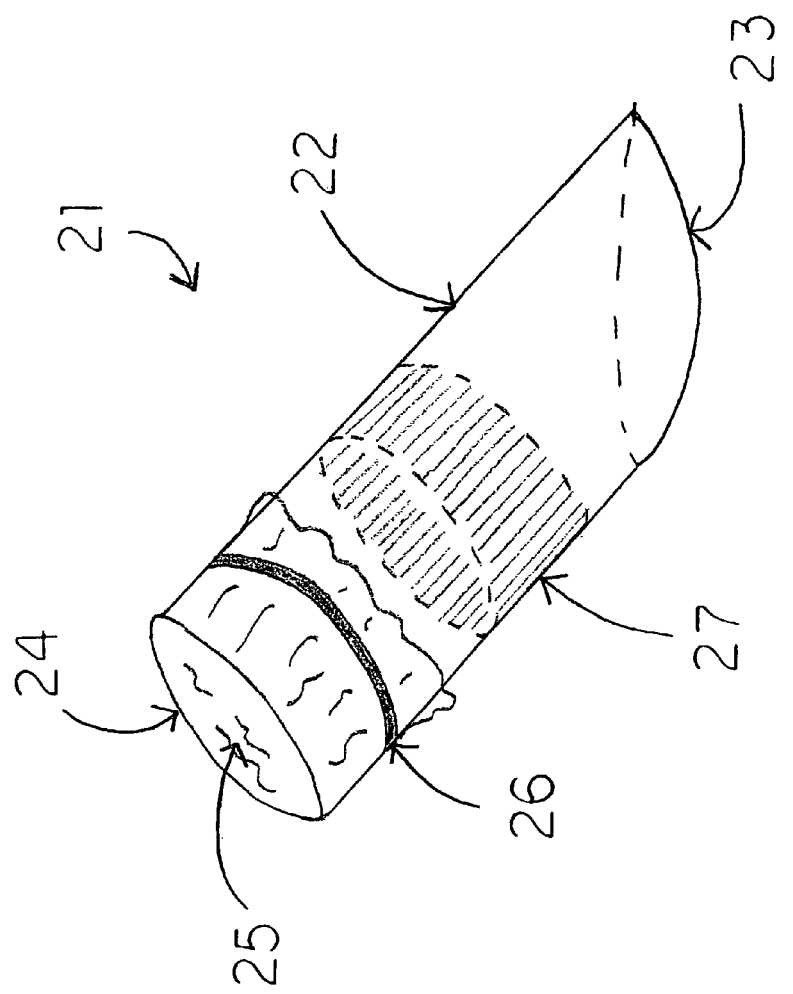

GROUND TRAP FOR EASTERN CICADA KILLER WASP

The present application is based on provisional U.S. Patent Application Ser. No. 61/573,183, filed on Sep. 21, 2011.

FIELD OF THE INVENTION

The present invention relates to the field of lawn care for residential and commercial units. Specifically, the invention relates to preservation of lawns by removal of female eastern cicada killer wasps from the premises. The males of the species always congregate around the females, and thus removal of the females assures that the males of the species will not be present in the area.

BACKGROUND OF THE INVENTION

Eastern cicada killer wasps are rather large flying insects that are destructive to grass lawns because of their habit of burrowing into the earth. A female eastern cicada killer wasp produces an array of offspring. The offspring rapidly multiply and produce hundreds of burrows in the ground. Also, eastern cicada killer wasps have a tendency to return to their place of birth, thus increasing the wasp population.

In the past, the problem of controlling the population of eastern cicada killer wasps was addressed by attacking the wasps with swatting devices, chemical sprays, toxic chemicals and the like. When toxic chemicals are poured down the openings of the underground burrows that are present on home lawns, they become a threat to humans and pets who use the lawns for recreation and the like. Even if the humans or pets do not come into direct contact with the toxic chemicals, they can be vulnerable to toxic vapors emanating from the underground burrows. There is a need for a safe, non-toxic, convenient method for controlling or eliminating the disturbing pest.

US Patent Application Publication No. 2010/0139151 (Cwiklinski et al) relates to a method for catching woodland, garden, and agricultural insect pests. The method includes providing a trap wherein the trap includes a catching part, a container for storing the captured pests, and a separating device for separating the captured insect pests from water and small debris. The separating device is placed on a movement path of the captured pests, which extends from an outlet opening of the catching part to the container. The separating device includes a mesh, the mesh being adapted to let water pass therethrough while insect pests do not pass therethrough and are thus separated by the mesh from water and small debris. The trap is hung with a bottom of the container for storing the caught pests being in a horizontal position, so that water entering the trap does not enter into the container storing the captured pests.

US Patent Application Publication No. 2010/0043275 (Battick) discloses a device for entrapping crawling insects. The device includes an elongated strip, including a first wall propagating along the strip and having a front surface and a back surface; and at least one second wall, the second wall disposed on the front surface and forming with the first wall a cavity propagating along the strip. An insect-immobilizing substance is disposed in the cavity.

US Patent Application Publication No. 2009/0293342 (Winkler) discloses an insect trap which includes a durable housing formed from a single plastic sheet, wherein the housing is configured to include a flappable hook. The trap further includes an enclosure having two open ends, wherein the enclosure includes a plurality of surfaces. The trap further includes at least one insect trap liner, wherein the insect trap liner releasably attaches to at least one of the plurality of surfaces.

US Patent Application Publication No. 2009/0183419 (Harris) discloses an insect catching device including a tapered, truncated, hollow body having a non-drying glue substantially covering an interior surface of the body.

US Patent Application Publication No. 2007/0157506 (Sadovski et al) relates to a barrier for protecting against the penetration of pests, wherein a sticky material is incorporated in the barrier.

US Patent Application Publication No. 2004/0020104 (Feldhege et al) relates to a device for catching flying insects. The device includes a planar support and a fastening device. The support has a first surface (upper side) and a second surface (lower side), characterized in that at least one of the surfaces has a layer containing a substance which attracts insects and/or to which insects stick.

U.S. Pat. No. 6,625,922 (Ernsberger) relates to an insect trap for luring and retaining insects therein, the insect trap including a hollow housing having at least one opening therein. A hollow and enclosed cartridge member is totally positioned within the housing. The trap has at least one opening therein positionally aligned with the at least one opening of the housing so that insects may pass first directly through the opening of the housing prior to entering into any opening in the cartridge member; and then into the opening of the cartridge member. The trap further includes luring and retaining means positioned within the cartridge member for luring and retaining insects within the cartridge member.

U.S. Pat. No. 7,669,362 (Cwiklinski et al) relates to a trap for catching woodland, garden, and agricultural insect pests. The trap includes a catching part with an outlet opening, and a container for storing caught pests. The trap further includes a device for separating the captured pests from water and small debris. The device is placed on a movement path extending from the outlet opening of the catching part to the container. The shape of the device is that of a funnel having a funnel inlet covered up by a mesh and a funnel outlet situated outside of the container so that water and small debris may flow out of the funnel outlet and wherein the funnel inlet is placed between the outlet opening of the catching part and the container. The funnel is truncated diagonally so that the pests, which have fallen into the container, slide down the mesh covering, through the funnel inlet and fall into a chamber.

The references described above, when taken either alone or in combination, fail to anticipate the present invention as described and claimed herein below. There remains a need for a safe, environmentally friendly and effective trap for containing eastern cicada killer wasps.

SUMMARY OF THE INVENTION

Female cicada killer wasps, so named because they feast on cicadas, are rather large flying insects that are destructive to grass lawns because of their habit of burrowing into the earth. A female cicada killer wasp burrows into the ground and then produces offspring. Wasps rapidly multiply and the females readily produce hundreds of burrows in the ground. Further, both the male and female cicada killer wasps have a tendency to return to the place of their birth, thus increasing the wasp population. The present invention relates to a safe, non-toxic, environmentally friendly glue trap which is placed directly over a burrow opening at ground level A female cicada killer wasp leaves the burrow and heads for the light at the end of the trap. A transparent window at the far end of the trap, the end furthest from the ground, allows ambient light to penetrate into the interior of the trap. The wasp either hits the transparent window or turns around on its own. In either case, the wasp eventually hits a side of the trap and becomes stuck to the glue. The wasp fights to remove itself from the glue, but this effort only causes the wasp to be further bound to the side of the trap. After a period of time, the wasp expires. The wasp is not poisoned, because there are no toxic ingredients in the trap.

In an embodiment, the present invention relates to a kit for catching cicada killer wasps, specifically female cicada killer wasps, wherein the kit contains a self-assembling, foldable glue trap and a wicket-shaped peg. The self-assembling, foldable trap body includes a transparent window area, a tab section, a cut-out section for receiving the tab, and a main body section. One side of the main body section includes a non-toxic glue material wherein the side that contains the glue material is the inside of the fully assembled trap device. In the process of assembly, the transparent window area folds down and becomes the top of the trap. The transparent window area is generally square in shape. The transparent area can be cellophane or the like. The transparent window area extends directly from the main body section. When the trap is assembled, the main body section is hollow and rectangular in shape. A generally linear fold-line is positioned at the intersection of the transparent window area and the main body section.

The tab section folds inwardly and becomes one of the four sides of the trap. In an embodiment, the tab section is generally pseudo-trapezoidal in shape. By pseudo-trapezoidal is meant that the trapezoid is missing an acute angle, the acute angle being replaced with a right angle. Thus one complete side of the trapezoid is missing, the side simply having two right angles, and thus resembling a rectangle. If a trapezoid is viewed as a rectangle (or a square) having two right-angle triangles at either end, then the shape of the tab section can be seen as a trapezoid with one of the triangles missing. The tab section extends directly from the main body section. The functioning tab of the tab section extends directly from the top of the pseudo-trapezoid. A generally linear fold-line is positioned at the intersection of the tab section and the main body section.

BRIEF DESCRIPTION OF THE DRAWINGS

FIG. 3 is a representation of a ground trap of the present invention, wherein the trap is cylindrical in shape.

DETAILED DESCRIPTION OF THE INVENTION

Figure 1:
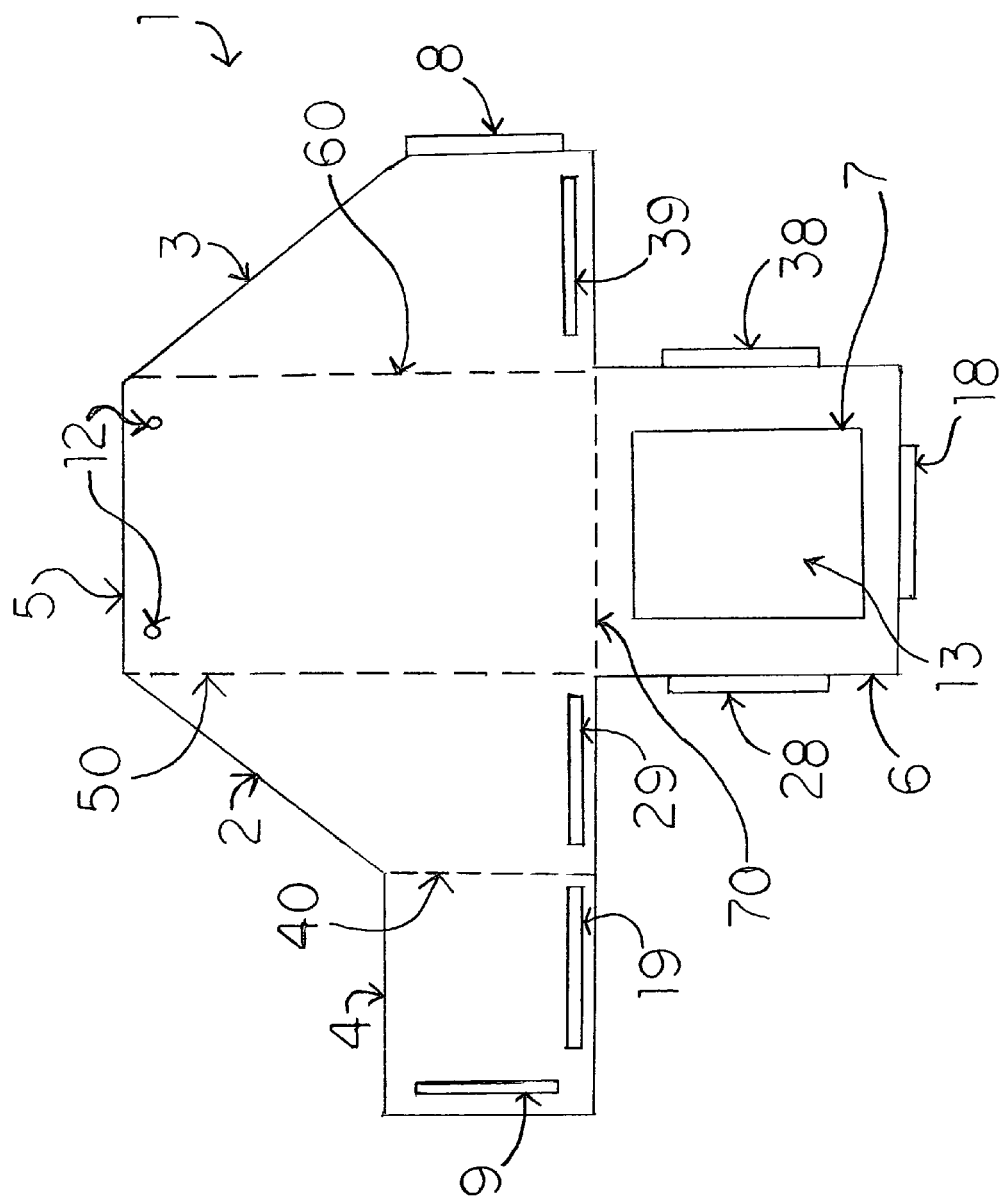
FIG. 1 is a representation of a ground trap of the present invention in a lay-flat, unassembled position.

Eastern cicada killer wasps are so named because they feast on cicadas. The female wasp burrows into the ground and prepares a place for her eggs to hatch. After the burrow is prepared, the female seeks out her prey and brings a cicada back to the burrow. Eggs are deposited on the dead cicada, which acts as a source of food for the pupae when they hatch.

The present invention is based on the observation that the best approach to controlling the eastern cicada killer wasp is to eliminate the female of the species. The best time to eliminate the female of the species is when the female is exiting the burrow that it constructed in the ground.

The present invention relates to a ground trap for catching the female eastern cicada killer wasp as it is flying out of the burrow. The ground trap includes a generally rectangular body and a generally square top section. The top section includes a transparent window to allow light into the inside of the trap body. The bottom of the trap is left open so that the flying insect can pass from the burrow directly into the trap. The bottom of the trap is beveled so that when the trap is standing on a flat surface, it leans to one side at an angle of about 45 degrees. The tilt of the trap allows for an insect to more readily attach to the glue-coated sidewalls of the trap.

In an embodiment, the trap of the present invention includes a generally cylindrical body, a top section including a transparent window and a glue composition. The inside of the generally cylindrical body is coated with the glue composition.

The present invention relates to a kit for catching eastern cicada killer wasps, specifically the female eastern cicada killer wasp. The kit comprises a safe, non-toxic, convenient and environmentally friendly ground trap. The trap is placed directly over the opening of a burrow at ground level. When the trap sits on the ground, it is positioned at about a 45 degree angle to the ground surface. The kit includes a plurality of foldable trap bodies, a plurality of marker flags, and a plurality of wicket-shaped pegs. Each trap body in the kit includes a planar surface. The planar surface includes a transparent window area, a sidewall area, a tab section and a slit section for receiving the tab. The sidewall area includes at least three separate sidewalls, and preferably four sidewalls. The inside (when assembled) of each of the sidewalls is coated with a non-toxic glue composition. The non-toxic glue composition that is coated on the inside of the sidewalls is preferably covered by a removable cover sheet or a plurality of removable cover sheets. The cover sheet can be removed during assembly of the trap body. In an embodiment, the assembled trap includes a rectangular shaped body.

In an embodiment, the present invention relates to a single sheet of foldable material cut and scored to define, when in the assembled position, a rectangular container having an open end and a closed end. The single sheet includes a top panel including a window opening. Preferably, the window opening is covered by transparent film or the like. This allows light to enter the interior of an assembled container, which is a result of the single sheet being folded. The single sheet further includes a pair of rectangular panels that form first and second opposed side walls of the completed container; wherein the first opposed side wall is substantially larger than the second opposed side wall. The top panel is directly connected to the larger opposed side wall, and is separated from the larger opposed side wall by a perforated score line for ease of folding. The single sheet further includes a pair of hemi-trapezoidal panels that form first and second opposed side walls of the assembled open-ended container; wherein the first and second walls are of substantially the same dimensions. By hemi-trapezoidal is meant that, if a trapezoid is viewed as a rectangle having a right angle triangle of substantially the same dimensions at either end, then the panels have the shape of a standard trapezoid, but with one right angle triangle present and one right angle triangle missing. The single sheet further includes a tab adapted to interlock with a slot to connect the opposed side wall of the pair of rectangular panels with the opposed side wall of the pair of hemi-trapezoidal panels. The tab is positioned on the side of the first opposed wall of the pair of hemi-trapezoidal panels. The single sheet further includes a slot adapted to receive the tab for interlocking. The slot is positioned on the side of the second opposed wall of the pair of rectangular panels. The order of side walls is: the second opposed side wall of the pair of rectangular panels, the second opposed wall containing the slot; the second opposed side wall of the pair of hemi-trapezoidal panels; the first opposed side wall of the first pair of rectangular panels, wherein this larger opposed side wall is directly connected to the top panel; and the first opposed wall of the pair of hemi-trapezoidal panels, the first opposed wall containing the tab.

Score lines are formed at the junctions between the walls and at the junction between the top panel and the substantially larger opposed side wall. The single sheet of foldable material, when in the assembled position, forms an open-ended container. When the open end is placed on the ground and the top panel is facing upwardly, the container is at a 45 degree angle with respect to the ground.

Referring to FIG. 1, the drawing is a representation of a single sheet 1 of foldable, rigid material which is cut and scored. The single sheet 1 includes five distinct panels, which, when folded along the generally linear score lines 40, 50, 60 and 70, define a substantially rectangular, hollow container having an open and a closed end. The open end, which represents the bottom of the container and rests directly on the ground when positioned as a ground trap, is generally bevelled. The generally bevelled open end allows the container to sit on the ground in an upright, yet slanted, position. The five distinct panels which make up the single sheet 1 are: a generally rectangular side panel 5, two generally hemi-trapezoidal side panels 2 and 3, a generally square side panel 4, and a generally square top panel 6. The substantially rectangular, hollow container (shown in FIG. 2) includes opposed side panels 4 and 5, and opposed side panels 2 and 3. Each of the five distinct panels is separated from another panel(s) by a generally linear score line. Panel 4 is separated from panel 2 by score line 40. Panel 2 is separated from panel 5 by score line 50. Panel 5 is separated from panel 3 by score line 60. Panel 6 is separated from panel 5 by score line 70. Panels 4, 2, 5 and 3 are serially adjacent to each other in a first direction. Panels 5 and 6 are serially adjacent to each other in a second direction, wherein the second direction is perpendicular to the first direction. Panel 4 includes a first slot 9 and a second slot 19, wherein slot 9 receives first tab 8 and slot 19 receives second tab 18. Panel 2 includes a third slot 29, wherein the slot 29 receives third tab 28. Panel 3 includes a fourth slot 39 and a first tab 8, wherein fourth slot 39 receives fourth tab 38. Panel 6 includes three tabs and a window area 7. The three tabs attached to panel 6 are second tab 18, third tab 28 and fourth tab 38. The window area 7 can be covered with a transparent material 13 such as cellophane, clear olefinic plastic material or the like. Panel 5 contains two apertures . . . for receiving a wicket or the like.

Figure 2:
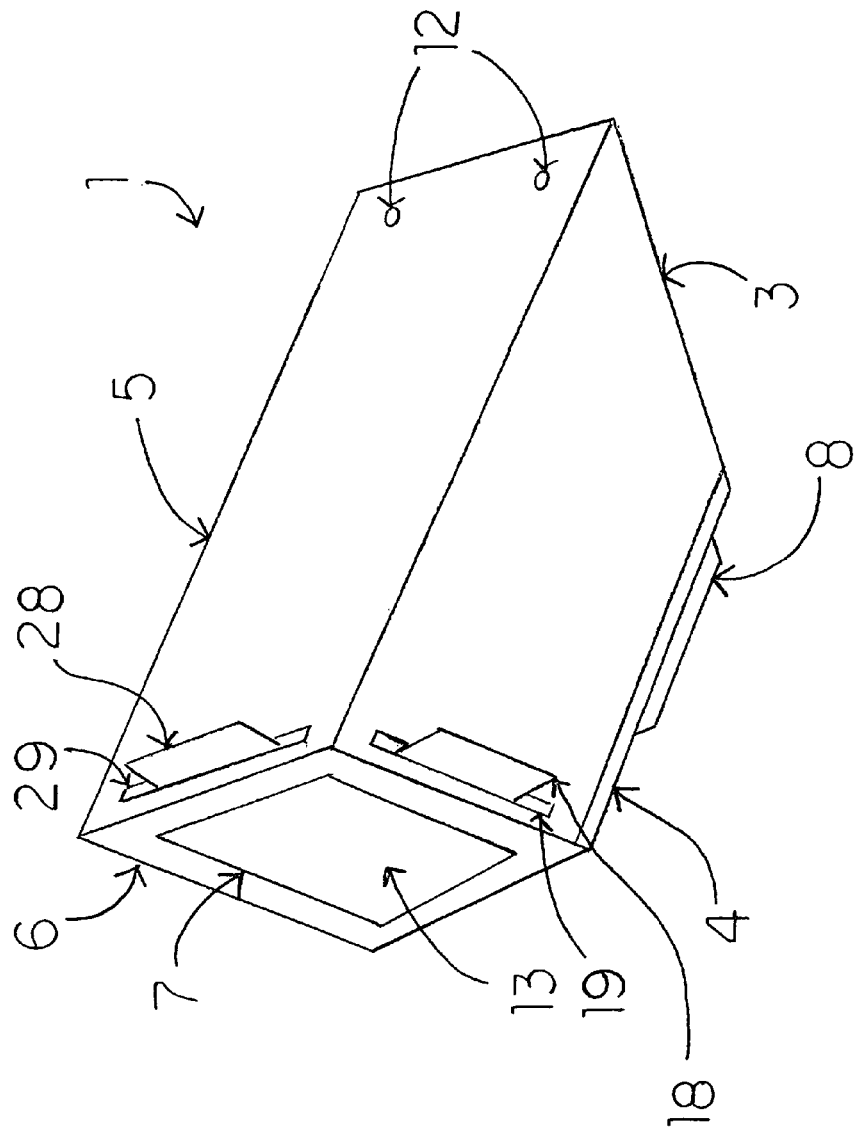
FIG. 2 is a representation of a ground trap of the present invention in a fully assembled and operative position, wherein the trap is rectangular in shape.

Referring to FIG. 2, the drawing is a representation of a fully assembled and operative ground trap wherein the trap is generally rectangular in shape. Single sheet 1 is now folded container 1 which operates as the ground trap of the present invention. Container 1 (formerly, single sheet 1) includes a top panel 6, which includes window opening 7. Window opening 7 is covered by a generally transparent film 13. Container 1 further includes a pair of first and second opposed walls represented by rectangular panels 5 and 4. In FIG. 2, the entire panel 5 is shown but only the leading edge of panel 4 is shown. Panel 4 contains a slot (not shown) which receives tab 8, which is directly attached to hemi-trapezoidal panel 3. Container 1 further includes apertures 12 located at the bottom of rectangular panel 5. When the container 1 is positioned on the ground, it is secured in place by a wicket-shaped wire or the like which extends through the apertures 12 and into the ground.

Referring to FIG. 3, the drawing is a representation of an alternative embodiment of the present invention wherein a ground trap 21 includes a generally cylindrical body 22. The cylindrical body 22 has an open end and a closed end. The closed end is covered by a transparent flexible film 25, which is secured in place by a rubber band 26. A glue board 27 is attached to the inside of the cylindrical body 22. The glue board is coated with nontoxic glue. The glue board 27 is secured to the inside of the cylindrical body 22 by means of staples, adhesive material, Velcro, adhesive tape, tacks or the like.

While the invention has been described by the various embodiments and descriptions, there is no intent to limit the inventive concept except within the metes and bounds of the following claims.

The invention claimed is:

1. A sheet of foldable material cut and scored to define, when in an assembled position, a rectangular container having an open end and a closed end, the sheet comprising:
    a top panel including a window opening, wherein the window opening is covered by transparent film;
    a pair of rectangular panels that form first and second opposed side walls of the container; wherein the first opposed side wall is substantially larger than the second opposed side wall; and wherein the top panel is directly connected to the first opposed side wall;
    a pair of hemi-trapezoidal panels that form third and fourth opposed side walls of the container; wherein the third and fourth walls are of substantially the same dimensions;
    a tab adapted to interlock to connect the pair of rectangular panels with the pair of hemi-trapezoidal panels, wherein the tab is positioned on a side of the fourth opposed wall of the pair of hemi-trapezoidal panels; and
    a slot adapted to receive the tab for interlocking, wherein the slot is positioned on a side of the second opposed wall of the pair of rectangular panels, wherein a first score line is formed between the second opposed side wall and the third opposed side wall, a second score line is formed between the third opposed side wall and the first opposed side wall, a third score line is formed between the first opposed side wall and the fourth opposed side wall and a fourth score line is formed between the top panel and the first opposed side wall; and wherein the open end of the container is beveled.

2. The sheet of claim 1 wherein at least a portion of the pair of rectangular panels and at least a portion of the pair of hemi-trapezoidal panels includes a coating comprising a non-toxic glue, wherein the coating of the non-toxic glue resides on an internal portion of the rectangular container when assembled from the sheet of foldable material.

3. The sheet of claim 1 wherein the foldable material includes a material selected from the group consisting of cardboard, paperboard, contact paper, laminated paper, and construction paper and bristle board.

4. The sheet of claim 1 wherein the first substantially larger opposed side wall includes two apertures for receiving a wicket-shaped peg, wherein the apertures are located near the open end of the container when assembled.

5. The sheet of claim 1 wherein the transparent film includes a member selected from the group consisting of cellophane, vinylidene chloride film (Saran), polyethylene film, polypropylene film, and PET film.

* * * * *